June 22, 1965  H. GREER ETAL  3,191,033
RADIATION FALLOUT METER
Filed May 11, 1962

Harold Greer,
Richard William Slocum, Jr.,
INVENTORS.
WHANN & McMANIGAL
Attorneys for Applicants Patented June 22, 1965

3,191,033
RADIATION FALLOUT METER
Harold Greer, 710 N. June St., Los Angeles, Calif., and Richard William Slocum, Jr., Portuguese Bend, Calif. (22 Southfield Drive, Rolling Hills, Calif.)
Filed May 11, 1962, Ser. No. 193,914
4 Claims. (Cl. 250—78)

This invention relates generally to detectors for penetrating radiation, and particularly relates to a meter for detecting and measuring ambient penetrating radiation, such as radioactive fallout.

There has long been a need for a simple, reliable and inexpensive meter for detecting and measuring gamma and beta radiation or other penetrating radiation. Such a meter is useful for workers and scientists who may have to expose themselves to radiation such as is present, for example, in the vicinity of a nuclear reactor or other device creating an unknown and possibly dangerous level of radiation.

Furthermore, a detector of penetrating radiation would be suitable in the hands of the average person to measure and detect radioactive fallout which may be caused by nuclear accidents or possibly by the use of nuclear weapons. Such an instrument must be simply and ruggedly constructed and must have a long useful life so that it will operate reliably whenever it is needed. If the instrument should deteriorate before its intended use, it would become wholly unreliable and worse than no instrument, in view of its possible false indication of the ambient radiation level.

The radiation detector of the present invention makes use of a scintillating crystal. A scintillating crystal is a crystal which emits flashes of light under the influence of penetrating radiation. Many types of scintillating crystals as well as scintillating materials are well known in the art. A scintillating crystal is responsive directly only to ionizing radiation such as electrons or beta rays as well as alpha rays. However, a scintillating crystal will also respond to gamma radiation. A gamma ray may lose part or all of its energy during its passage through a scintillating crystal. For example, the gamma ray may lose part of its energy by Compton scattering and the lost energy appears in the form of an electron or beta ray. Furthermore, the gamma ray may lose all of its energy by the photoelectric process. In that case, the energy appears in the form of the velocity of a photo-electron. Finally, the gamma ray may create a "pair" consisting of an electron and a positron. The crystal is then directly responsive to the thus created electrons. It is also feasible to make a scintillating crystal responsive to neutrons. This can be effected, for example, by adding boron to the crystal or by surrounding the crystal with a layer of boron. A neutron interacts with a boron nucleus to create an alpha particle, the remainder being a lithium nucleus.

Gamma ray meters which make use of scintillating crystals are well known. However, the conventional gamma ray meter is rather delicate and uusally requires a photomultiplier tube for detecting and amplifying the light flashes. Thus, such conventional gamma ray meters are very expensive and require a well-regulated voltage supply.

Other gamma ray detectors employ the principle of electroscopic ionization. These meters are really dosimeters and hence require at least two readings over a time interval to determine the actual radiation rate.

Other radiation detectors have been proposed which may include a phosphor capable of emitting light when struck by radiation. However, such prior art radiation detectors require the use of a standard light source for comparison purposes. This standard light source may in turn be created by a special radioactive source and a separate phosphor. Obviously such radioactive source, since it has only a limited half-life, will deteriorate over a period of months or years and hence the useful life of the instrument is strictly limited. Additionally, a radioactive source increases the cost of the detector, decreases the accuracy since its radioactive strength decreases with time, and adds to the radioactive danger by its own radiation.

It has further been suggested to utilize crystals having F-centers. Such crystals include the alkali halides and other ionic crystals and vary their opacity as a function of the radiation. The variable opacity of the ionic crystal can be utilized to determine the amount of radiation by comparing the light transmitted by the opaque crystal with a standard light source.

It is accordingly an object of the present invention to provide an improved radiation fallout meter which is rugged, reliable and can be manufactured in large quantities at low cost.

Another object of the present invention is to provide a meter for detecting and measuring penetrating radiation which requires no electric power for its operation.

A further object of the present invention is to provide a radiation fallout meter or radiation detector which can be operated by the average person without requiring extensive training or detailed instructions and which has a long shelf life.

In accordance with the present invention there is provided a meter for detecting and measuring the level of ambient penetrating radiation. The meter includes a light-tight housing. A scintillating material is disposed in the housing. This scintillating material may include scintillating crystals capable of producing visible light flashes under the influence of penetrating radiation. The penetrating radiation may include alpha rays, gamma rays, as well as beta rays or electrons. Furthermore, the penetrating radiation may include neutrons.

There is further disposed on the housing an eye piece which permits viewing of the scintillating crystal. A light absorbing means is disposed between the scintillating material and the eye piece and is movable to vary the amount of light passing from the scintillating material to the eye piece. The light absorbing means may consist, for example, of a set of gradated light absorbing filters. Alternatively, there may be provided a light polarizer cooperating with a light analyzer so that when either the polarizer and analyzer is rotated with respect to the other, a variable amount of light is absorbed between the scintillating crystal and the eye piece. As a result, a viewer looking at the eye piece may move the light absorbing means or rotate it until substantially no light reaches his eye. In this way, the level of radiation may readily be determined. A suitable scale may be coupled to the light absorbing means and may be graduated to indicate the radiation intensity.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawing, in which:

Figure 1:
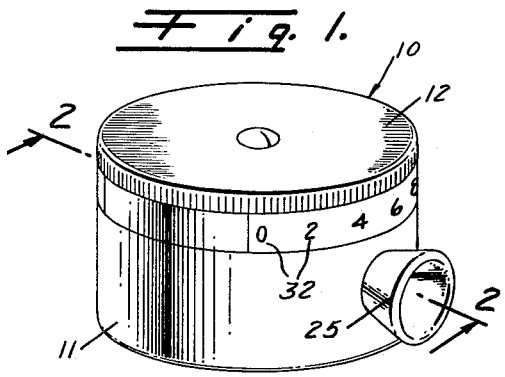
FIG. 1 is a view in perspective of one embodiment of the radiation meter of the present invention.
Figure 2:
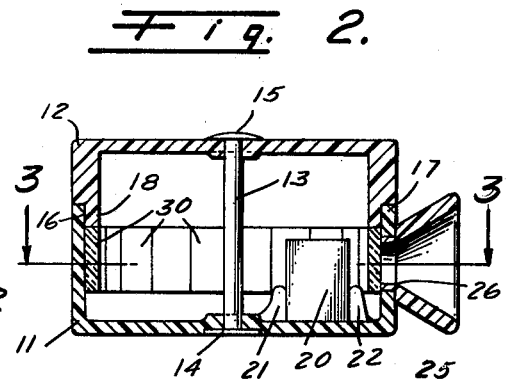
FIG. 2 is a sectional view taken on line 2—2 of FIG. 1.
Figure 3:
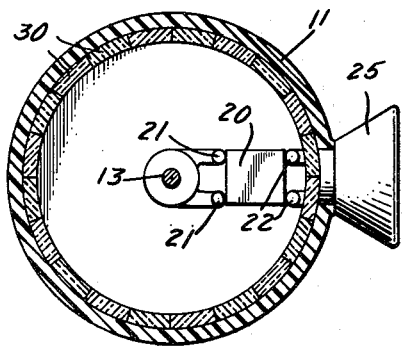
FIG. 3 is a cross-sectional view taken substantially on line 3—3 of FIG. 2.

Referring now to the drawing and particularly FIGURES 1 to 3, there is illustrated a meter for detecting and measuring ambient penetrating radiation embodying the present invention. The radiation meter includes a housing generally indicated at 10 which consists essentially of a lower portion 11 and an upper portion 12. Each of the two housing portions 11 and 12 may be of hollow cylindrical shape as illustrated and may consist of a suitable plastic material which preferably is black so as to form a light-tight housing. The two housing portions 11 and 12 are arranged to be rotatable with respect to each other. To this end, a rod 13 may be secured into the lower housing portion 11. To this end, the rod may be secured to a base 14 which in turn is cemented to a corresponding recess in the housing portion 11. The rod 13 is also provided with a head 15 for securing it rotatably to the upper housing portion 12. The lower rim of the upper housing portion 12 is recessed as at 16 to accommodate the upper rim 17 of the lower housing portion 11. There is also provided a dependent annular portion 18 disposed within the lower housing portion 11.

In accordance with the invention there is provided a scintillating material 20 which may conveniently be of cylindrical shape and which is secured to or disposed on the lower housing portion 11. The scintillating material 20 may, for example, consist of any conventional scintillating crystal such as sodium iodide, thallium activated, anthracene or one of the tungstates such as cadmium or calcium tungstate. Alternatively, the scintillating material 20 may consist of a plastic scintillator. Finally, the scintillating material 20 may be a liquid.

A plastic scintillator may, for example, consist of 36 g. p-terphenyl and 0.2 grams of 1,1,4,4-tetraphenyl-1,3 butadiene. These two crystalline materials are then dissolved in one liter of a styrene monomer which is subsequently polymerized to form a plastic phosphor or scintillator. Alternatively, the plastic scintillator may be a material sold under the trademark "Pilot" which contains diphenylstilbene. Also, the plastic scintillator may be of the type sold in the trade under the name "NE 102" which contains scintillating material in polyvinyltoluene.

A liquid scintillating material may, for example, consist of 5 grams p-terphenyl in one liter of xylene. Another liquid scintillator consists of 3 grams p-terphenyl and an additional 0.01 gram of 1,6-diphenyl-1,3,5-hexatriene in one liter of phenylcyclohexane. Also, a liquid scintillator may consist of 5 grams p-terphenyl and an additional 0.02 gram of alpha-2-(1-napthyl)-5-phenyloxazole in one liter of toluene. It will be understood, however, that other scintillating crystals, plastic scintillators or liquid scintillators may be used instead.

The scintillating material may be simply cemented to the inner wall of the lower housing portion 11. Alternatively, suitable posts such as the posts 21 and 22 may be molded or extruded from the lower housing portion 11 or may be cemented thereto to support therebetween the scintillating material 20.

In case the scintillating material consists of a liquid, it may suitably be housed in a transparent Lucite container which may then be mounted between the posts 21 and 22.

The scintillating material 20 may be viewed through an eye piece 25 which may have an annular rim 26 which in turn may be cemented to a suitable aperture in the lower housing portion 11. Alternatively, the housing portion 11, the posts 21, 22 and the eye piece 25 may be molded integrally in a single piece.

Figure 4:
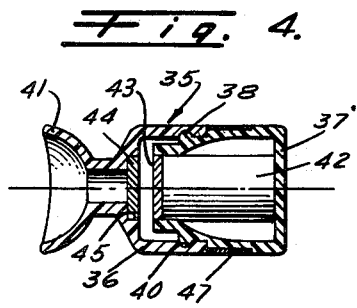
FIG. 4 is a longitudinal sectional view of another embodiment of the radiation meter of the present invention.

Further in accordance with the present invention a gradated set of light filters indicated at 30 is provided. The light filters 30, may for example, for a dependent skirt secured to or mounted on the annular rim 18 of the upper housing portion 12. By way of example, FIGURES 3 and 4 illustrate 20 such light absorbing filters. These light absorbing filters may consist of a suitable set of glass panels, each being darker or less transparent to visible light than the previous one. Alternatively, the filters 30 may consist of film which has been suitably exposed and developed to provide a gradated set of filters. It is also feasible to use strips of film or the like on which black dots of varying density have been printed or photographed. Since the filters 30 are out of focus to a viewer looking through the eye piece 25, the individual dots are not visible to the eye. It will be understood that a suitable window of glass or film may be disposed in the eye piece 25. Alternatively, it also is feasible to provide a viewing lens. However, neither is required and it is feasible for the viewer to look at the scintillating material through the eye piece 25 with the naked eye.

A suitable scale 32 which may, for example, be calibrated in roentgens per hour may be provided on the outer rim of the upper housing portion 12. This scale preferably is a logarithmic scale because the relation between the radiation intensity and the resulting intensity of the light flashes is logarithmic as will be explained hereinafter in connection with FIGURE 5.

It may also be pointed out that the scintillating material 20 should emit light flashes within the visible spectrum. As pointed out before, the scintillating material, whether it be a crystal or a plastic or a liquid, is directly responsive to beta rays or electron and alpha rays and is also responsive to gamma rays. The material may be made responsive to neutrons by incorporating boron into the crystal or into the plasticizer or liquid of the scintillating material. Alternatively, the entire scintillating material may be surrounded by boron or a boron compound which will emit alpha rays in response to slow neutron radiation impinging thereon. Such a boron layer or a boron compound layer should be very thin so that the alpha particles created by the interaction with slow neutrons are able to emerge from the layer into the scintillating material. It will be understood that for all scintillating materials, the light intensity is proportional to the radiation intensity.

The operation of the detector of the invention will now be described. In the presence of ambient radiation, the radiation will eventually strike the scintillating material 20. Thereupon, the scintillating material emits flashes of visible light which may be viewed through the eye piece 25. The viewer then rotates the upper housing portion 12 with respect to the lower housing portion 11, until substantially no light is visible through the eye piece, that is, the adjustment may also be made until the light from the scintillating material is just barely visible through the appropriate filter 30. The radiation intensity may then be read from the scale 32, i.e., the radiation intensity corresponding to the number appearing above and opposite the eye piece 25.

It will be understood that the housing 10 will normally stop practically all alpha rays. However, the alpha rays which may be created by the interaction of slow neutrons with boron will be able to strike the scintillating material 20 thus causing light flashes. Furthermore, the plastic material of the housing 10 will also normally absorb most of the beta radiation, that is, most of the fast electrons. However, it is feasible to provide the housing 10 with a wall portion which is sufficiently thin to permit the beta rays to penetrate and strike the scintillating material 20. This will make it possible to measure, not only gamma rays but beta rays. This thin wall portion which permits the passage of beta rays may then be covered up at will with any beta ray absorbing material to permit measurements with and without the presence of beta rays.

Figure 5:
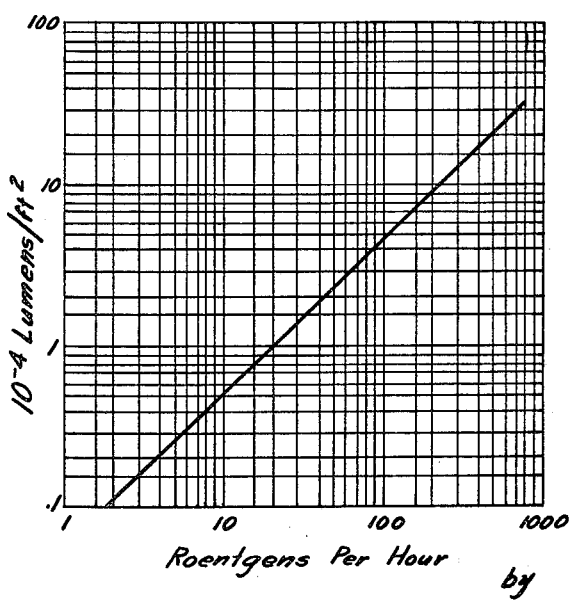
FIG. 5 is a chart showing the light intensity in lumens per square feet as a function of the radiation intensity in roentgens per hour as measured with the instrument of FIGURES 1 through 3.

The curve of FIGURE 5 to which reference is now made shows the light intensity in lumens per square foot as a function of radiation intensity in roentgens per hour.

This curve has been obtained by using a Cobalt 60 source as the radiation source. The scintillating material used for measuring the curve of FIGURE 5 was a plastic scintillator of a size of ⅜″ x ⅜″ x ¾″. Within experimental error, the curve of FIGURE 5 holds true for the three plastic scintillators which are commercially available and which have been referred to hereinbefore. The light intensity has been measured with a photomultiplier tube and converted into lumens per square foot.

Instead of using a set of gradated light filters, it is also feasible to utilize a light polarizer and a light analyzer. A detector according to the invention embodying this feature has been illustrated in FIGURE 4.

The meter of FIGURE 4 again consists of light-tight housing generally indicated at 35. The housing 35 consists of two housing portions 36 and 37 which are rotatable with respect to each other and which may consist of a black plastic material. Housing portion 37 is provided with an annular projection 38 which is received by a corresponding annular recess 40 in the housing portion 36. The projection 38 forms a bearing which permits the two housing portions to rotate with respect to each other. The housing portion 37 preferably is made of an elastic or flexible plastic material so that it may be sprung into the recess 40.

An eye piece 41 may be formed integral with the housing portion 36. A scintillating material 42 may be cemented to or otherwise secured to the housing portion 37. The scintillating material 42 may conveniently have the shape of a cylinder, and may consist of any of the materials previously described.

In accordance with the present invention, a light polarizer disc 43 is secured or cemented to the portion of the scintillating material 42 facing the eye piece 41. The light polarizer 43 may, for example, consist of a conventional sheet polarizer.

A corresponding light analyzer disc 44 may be provided in the housing portion 36 in a position to be viewed through the eye piece 41. Thus, there may be provided a suitable recess 45 in the housing portion 36 for receiving the light analyzer 44. The light analyzer 44 preferably consists of the same material as that of the light polarizer 43. A scale 47 may be secured to or form part of the housing portion 36 and is rotatable therewith.

The meter of FIGURE 4 operates as follows:

Again under the influence of ambient penetrating radiation the scintillating material 42 will emit light flashes which may be viewed by a viewer through the eye piece 41. The two housing portions 37 and 36 may then be rotated by the viewer with respect to each other. This will change the plane of polarization of the light polarizer 43 with respect to that of the light analyzer 44. As a result, a variable amount of light will be permitted to reach the eye of the observer looking through the eye piece 41. Thus, the two housing portions may be rotated until the light just disappears. The radiation level may then be read from the scale 47 indicating the radiation intensity.

There has thus been disclosed a radiation fallout meter which is rugged and simple in construction and may be manufactured at low cost. It may be noted here that a plastic scintillating material is more inexpensive than a large size scintillating crystal. On the other hand, since only relatively high levels of radiation are to be measured, there is no need for the ultimate in scintillation efficiency. Furthermore, the instrument of the present invention does not require any voltage or current supply. Furthermore, since the instrument does not employ a comparison radioactive source, its life is substantially indefinite, that is, it will last as long as a scintillation crystal will. The instrument is so simple to operate that it can be used by the average person without detailed instructions or any training whatsoever.

We claim:

1. A meter for detecting and measuring the intensity of ambient penetrating radiation comprising:

(A) a light tight housing having two cylindrical portions in interesting relationship and rotatable with respect to each other;
(B) a scintillating material capable of emitting visible light flashes under the influence of penetrating radiation, said scintillating material being disposed on one of said housing portions;
(C) an eye piece on said one of said housing portions arranged to permit viewing said scintillating material;
(D) a set of gradated light absorbing filters forming a dependent skirt on the other one of said housing portions, said skirt being disposed to rotate between said scintillating material and said eye piece;
(E) and a scale on said other housing portion and calibrated to indicate radiation intensity, whereby a viewer looking through said eye piece may rotate said housing portions with respect to each other until substantially no light reaches his eye to determine the radiation intensity.

2. A meter for detecting and measuring the intensity of ambient penetrating radiation comprising:

(A) a light tight housing having two cylindrical portions nesting within each other and rotatable with respect to each other;
(B) a scintillating material capable of emitting visible light flashes under the influence of penetrating radiation, said scintillating material being disposed on one of said housing portions;
(C) an eye piece on said one of said housing portions arranged to permit viewing said scintillating material;
(D) a set of gradated light absorbing filters forming a dependent skirt on the other one of said housing portions, said skirt being disposed to rotate between said scintillating material and said eye piece;
(E) and a scale disposed on the outside of said other housing portion and calibrated to indicate radiation intensity, whereby a viewer looking through said eye piece may rotate said housing portions with respect to each other until substantially no light reaches his eye to determine the radiation intensity.

3. A meter for detecting and measuring the intensity of ambient penetrating radiation comprising:

(A) a light tight housing having two portions rotatable with respect to each other;
(B) a scintillating material capable of emitting visible light flashes under the influence of penetrating radiation, said scintillating material being disposed on one of said housing portions;
(C) an eye piece on the other one of said housing portions arranged to permit viewing said plastic scintillator;
(D) a light polarizer mounted on said one of said housing portions and disposed in the light path between said scintillating material and said eye piece;
(E) a light analyzer mounted on said other one of said housing portions and disposed in the light path between said scintillating material and said eye piece;
(F) and a scale on said other housing portion and calibrated to indicate radiation intensity, whereby a viewer looking through said eye piece may rotate said housing portions with respect to each other until substantially no light reaches his eye to determine the radiation intensity.

4. A meter for detecting and measuring the intensity of ambient penetrating radiation comprising:

(A) a light tight housing having two tubular portions nesting one inside the other and rotatable with respect to each other;
(B) a plastic scintillator capable of emitting visible light flashes under the influence of penetrating radiation, said plastic scintillator being disposed one of said housing portions;
(C) an eye piece on the other one of said housing portions arranged to permit viewing said plastic scintillator;
(D) a light polarizer mounted on said plastic scintillator and disposed in the light path between said plastic scintillator and said eye piece;

(E) a light analyzer disposed in said eye piece, whereby relative rotation of said housing portions with respect to each other will cause absorption of a variable amount of light emitted by said scintillator;

(F) and a scale on one of said housing portions and calibrated to indicate radiation intensity, whereby a viewer looking through said eye piece may rotate said housing portions with respect to each other until substantially no light reaches his eye to determine the radiation intensity.

References Cited by the Examiner
UNITED STATES PATENTS

| | | | |
|---|---|---|---|
| 1,915,033 | 6/33 | Schlichter | 88—23 |
| 2,342,061 | 2/44 | Rath | 88—23 |
| 2,966,589 | 12/60 | Liebson et al. | 250—78 |

FOREIGN PATENTS 786,814  11/57  Great Britain.

OTHER REFERENCES

Fluorescent Liquids for Scintillation Counters, by Kallman et al., from Nucleonics, vol. 8, No. 3, March 1951, pp. 32 to 39.

On Plastic Scintillation Phosphors, by Kloepper et al., from Review of Scientific Instruments, vol. 23, No. 8, August 1952, pp. 446, 447.

RALPH G. NILSON, *Primary Examiner.*

ARCHIE R. BORCHELT, *Examiner.*

UNITED STATES PATENT OFFICE
CERTIFICATE OF CORRECTION

Patent No. 3,191,033 June 22, 1965

Harold Greer et al.

It is hereby certified that error appears in the above numbered patent requiring correction and that the said Letters Patent should read as corrected below.

Column 1, line 39, for "wall" read -- well --; line 59, for "uusally" read -- usually --; column 3, line 44, for "diphenylstilbene" read -- diphenlstilbene --; line 75, for "for", second occurrence, read -- form --; column 6, line 2, for "interesting" read -- internesting --.

Signed and sealed this 15th day of March 1966.

(SEAL)
Attest:

ERNEST W. SWIDER
Attesting Officer

EDWARD J. BRENNER
Commissioner of Patents